United States Patent Office
3,814,774
Patented June 4, 1974

3,814,774
3,5-DICHLORO-2-PYRIDOXYETHYL ETHERS
Reginald L. Whitaker, Tacoma, Wash., and Herbert Q. Smith, Malvern, Pa., assignors to Pennwalt Corporation, Philadelphia, Pa.
No Drawing. Continuation-in-part of abandoned application Ser. No. 115,707, Feb. 16, 1971. This application Aug. 28, 1972, Ser. No. 284,316
Int. Cl. C07d 31/30
U.S. Cl. 260—297 R          7 Claims

ABSTRACT OF THE DISCLOSURE 3,5-dichloro-2-pyridoxyethyl hydrocarbon ether having the structure:

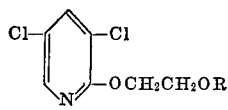

where R is an aliphatic or aromatic radical, is used as a pre-emergent herbicide for crops by applying to the soil, a weed-phytotoxic amount of the ether prior to the emergence of the food crop plants.

---

This application is a continuation-in-part application of Ser. No. 115,707, filed Feb. 16, 1971, now abandoned.

BACKGROUND OF THE INVENTION

1. Field of the invention

This invention relates to herbicidal compositions and methods for their utilization for controlling the growth of weeds. More particularly, this invention relates to 3,5-dichloro-2-pyridoxyethyl ethers and their use as a pre-emergence herbicide for controlling weeds.

2. Description of the prior art

A pre-emergence herbicide is a compound that destroys or prevents the growth of a wide variety of weeds and other unwanted vegetation without damaging the sought after crop, e.g., does not inhibit the emergence or retard the growth of a food crop.

Pyridine compounds have been used as plant growth regulators and pre-emergence herbicides. However, the relationship between the structure of the pyridine compound and its herbicidal activity is undefined. Often, pyridine compounds retard the pre-emergence of crop seeds to the same degree they do the weed seeds. For example; in U.S. 3,249,419, at column 8, a table discloses the results of treatment of flats containing seeds of crop plants and weeds with hydroxy-halopyridines. The table indicates that 90 to 100% of food crop seeds failed to germinate at the lowest dosage indicated.

H. Veldstra in "Chemistry and Mode of Action Plant Growth Substances" (London, 1955) pages 129 to 130, discusses the activity of pyridine compounds in promoting or influencing the growth of certain food crops. In particular, 3,5-dichloro-2-pyridoxyacetic acid is shown to have activity approaching the level of indoleacetic acid. However, this discussion was directed to the relationship between the pyridine compounds' structure and activity in influencing plant growth, i.e., their effect on established plants. Their activity as pre-emergence herbicides is undiscussed, and accordingly, the relationship between the structure of pyridine compounds and their activity as pre-emergence herbicides is not established by Veldstra.

SUMMARY OF THE INVENTION

The invention sought to be patented in its composition aspect is described as residing in the concept of a chemical compound having a molecular structure of the 3,5-dichloro-2-pyridoxyethyl nucleus to which there is attached a hydrocarbon oxide radical (OR), as is shown in the following structure:

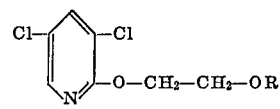

The invention sought to be patented in its process of using aspect resides in the concept of administering to soil, prior to the emergence of crops therefrom, a weed phytotoxic amount of a composition of matter having a molecular structure in which a hydrocarbon oxide radical is attached to the ethyl radical of a 3,5-dichloro-2-pyridoxyethyl nucleus as the essential active ingredient of a pre-emergence formulation for the suppression of weeds in the soil.

The embodiments of the composition aspect of the invention possess the inherent general property of solubility in many organic solvents and aqueous acid solutions from which the acid salts may be obtained on evaporation of the water. Examination of the compounds produced according to the hereinafter described process with ultraviolet and infra-red spectographic analysis, yields spectral data confirming molecular structure hereinbefore set forth. The aforementoined physical characteristics taken together with the nature of the starting materials and the mode of synthesis positively confirm the structure of the composition sought to be patented. As used herein, the term hydrocarbon oxide, —OR means wherein the hydrocarbon R contains from one to 18 carbon atoms and is alkyl including cycloalkyl, alkenyl, alkynyl, haloalkyl, haloalkylyl, wherein one or more halogen atom is present, aryl and aralkyl.

DESCRIPTION OF THE PREFERRED EMBODIMENT

More preferred is the embodiment of the 3,5-dichloro-2-pyridoxyethyl nucleus having a hydrocarboxide radical, OR, wherein the R group is selected from the group consisting of alkyl, haloalky, alkenyl and haloalkenyl. As used throughout this specification and in the claims the term alkyl is meant to include cycloalkyl. Haloalkyl and haloalkenyl is intended to include polyhalogenated alkyl and alkenyl radicals.

Most preferred is the embodiment of the 3,5-dichoro-2-pyridoxyethyl nucleus having a hydrocarbon oxide radical, OR, wherein the R group is selected from the group consisting of alkyl and chlorinated alkyl. The term chlorinated alkyl includes compounds having 1 to 6 chlorine atoms on the alkyl radical.

The manner and process of making and using the invention will now be generally described so as to enable a person skilled in the art of chemistry to make and use the same, as follows:

The 2,3,5-trichloropyridine employed as a starting material for the preparation of the physical embodiments of the composition aspect of our invention is generally known or readily prepared by procedures known to those skilled in the art.

According to one procedure, the physical embodiment of our concept is made by reacting 2,3,5-trichloropyridine with an alkali metal salt of a mono ether of ethylene glycol wherein the mono ether bears an R group desired on the ether oxygen of the composition of the invention.

This reaction is shown as follows:

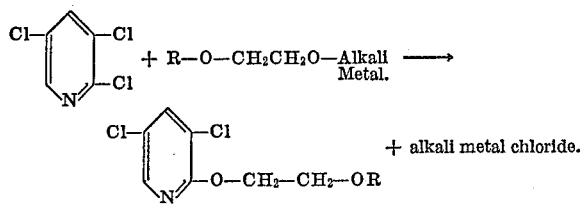

The reactants are mixed together without a solvent and heated above room temperature generally about 50° C. with a trace amount of copper powder. Usually, an exothermic reaction occurs causing the temperature of the reaction mixture to rise about 100° C.

In another procedure, the alkali metal salt is allowed to react with 2,3,5-trichloropyridine in the presence of a solvent. The reaction is carried out at reflux for several hours. The alkali metal salt of the mono ether of ethylene glycol is prepared by treating the mono ether of ethylene glycol with an alkali metal hydride, e.g., sodium hydride, in an inert solvent such as tetrahydrofuran or with an alkali metal tertiary alkoxide, e.g., potassium tertiary butoxide in a polar solvent such as tertiary butanol.

The R group of the 3,5-dichloropyridoxyethyl ether can also be reacted with chemicals in order to introduce additional substituents onto the R group. For example, when the R group is an allyl radical, it may be chlorinated to produce 3,5-dichloropyridoxyethyl 2,3-dichloropropyl ether. Similarly, when the R group is phenyl, benzyl or substituted benzyl, then reactions may be carried out on the phenyl or benzyl portion of the 3,5-dichloropyridoxyethyl ether in order to further modify the structure of the R group.

The ethylene radical bridging the 3,5-pyridoxy group and the OR group is shown in the above structural formula without substituents. However, it is apparent that lower alkyl substituents may be placed on one or both of its carbon atoms to form homologues of the present invention.

The following examples are illustrative of the methods employed to prepare the compounds.

EXAMPLE 1

3,5-dichloro-2-[(2-phenoxy)ethoxy]pyridine

Prepare a suspension of 4.4 grams (0.11 moles) of sodium hydride in 50 milliliters of tetrahydrofuran using a 60% mixture of sodium hydride in oil. Add a solution of 13.8 grams (0.10 moles) of 2-phenoxyethanol in 50 milliliters of tetrahydrofuran to the sodium hydride suspension. An exothermic reaction occurs accompanied by hydrogen being evolved. Stir the resulting suspension for three hours after the addition is completed. Evaporate the tetrahydrofuran with a stream of nitrogen gas until a powdery residue remains. Add 18.3 grams (0.10 moles) of 2,3,5-trichloropyridine and 0.3 gram of copper powder to the residue. Stir the mixture and heat gently to 50° C. until an exothermic reaction occurs causing a slow temperature rise to 100° C. Then a more rapid temperature rise to 180° C. Maintain the temperature at 180° C. for one hour and cool to ambient temperature. Dissolve the product in 250 milliliters of methylene chloride, filter to remove solids and concentrate the filtrate in vacuo to a viscous semisolid residue. Recrystallization of the residue from petroleum ether including treatment with decolorizing charcoal yields about 19 grams of 3,5-dichloro-2-[(2-phenoxy)ethoxy]pyridine melting at 40–42° C.

Analysis.—Calculated: C, 54.95; H, 3.90; Cl, 24.96; N, 4.93. Found: C, 55.39; H, 4.06; Cl, 24.91; N, 4.78.

EXAMPLE 2

3,5-dichloro-2-[(2-allyloxy)ethoxy]pyridine

Follow the procedure of Example 1 using 10.2 grams of 2-allyloxyethanol in place of the 2-phenoxyethanol. Distill the residue remaining after evaporation of the methylene chloride through a 4 inch helix-packed column. The product is a liquid, boiling point 87–80° C./0.55 millimeters of mercury, $n_D^{25}$ 1.5278.

Analysis.—Calculated: C, 48.40; H, 4.47; Cl, 28.58; N, 5.56. Found: C, 48.49; H, 4.47; Cl, 28.32; N, 5.52.

EXAMPLE 3

3,5-dichloro-2-[(2-ethoxy)ethoxy]pyridine

Follow the procedure of Example 1 using 9.0 grams of ethylene glycol monoethyl ether in place of the 2-phenoxy ethanol. Distill the residue from the methylene chloride evaporation through a 4 inch column packed with glass helices. The product distills at about 76–78° C./0.05 millimeters of mercury, $n_D^{25}$ 1.210.

Analysis.—Calculated: C, 45.90; H, 4.76; Cl, 29.69; N, 5.87. Found: C, 45.78; H, 4.70; Cl, 30.04; N, 5.93.

EXAMPLE 4

3,5-dichloro-2-[(2-benzyloxy)ethoxy]pyridine

Following the procedure of Example 1 using 0.1 mole of 2-benzyloxyethanol. Distill the product through a 4 inch helix-packed column. The product is a liquid boiling 138–142° C./0.05 millimeters of mercury, $n_D^{25}$ 1.5643.

Analysis.—Calculated: C, 56.39; H, 4.39; Cl, 23.79; N, 4.70. Found: C, 56.97; H, 4.45; Cl, 22.78; N, 4.81.

EXAMPLE 5

3,5-dichloro-2-[(2-methoxy)ethoxy]pyridine

Add 7.6 grams (0.10 moles) of ethylene glycol monomethyl ether to 11.2 grams (0.10 moles) of potassium tertiary-butoxide in 100 milliliters of tertiary butanol. Then add 18.3 grams (0.10 moles) of 2,3,5-trichloropyridine and reflux for 20 hours. Cool, filter off the solid residue which deposits and wash the residue with 50 milliliters of ethyl ether. Combine the ether washings and the filtrate and concentrate in a vacuum to a semi-solid liquid. Take the semi-solid liquid up in 100 milliliters of hexane and filter off the insoluble residue. Concentrate the filtrate in vacuum and distill the oil residue through a 4 inch helix-packed column. The product boils 78–81° C. at 0.10 millimeters of mercury, $n_D^{25}$ 1.5320. On standing, the product crystallizes to a solid melting 36–37° C.

Analysis.—Calculated: C, 43.26; H, 4.08; Cl, 31.93. Found: C, 43.47; H, 4.12; Cl, 31.97.

EXAMPLE 6

3,5-Dichloro-2-[(2-propoxy)ethoxy]pyridine

Follow the procedure of Example 5 using 10.4 grams (0.1 mole) of 2-(n-propoxy)ethanol in place of the monomethyl ether of ethylene glycol. Distill the product through a 4 inch helix-packed column. The product boils at 88–90° C./0.08 millimeters of mercury, $n_D^{25}$ 1.5148.

Analysis.—Calculated: C, 48.02; H, 5.24; Cl, 28.35; N, 5.60. Found: C, 47.90; H, 5.10; Cl, 27.98; N, 5.62.

EXAMPLE 7

3,5-Dichloro-2-[(2-butoxy)ethoxy]pyridine

Follow the procedure of Example 5 using 11.8 grams (0.1 mole) of the mono-n-butyl ether of ethylene glycol in place of the monomethyl ether of ethyleneglycol. Distill the product through a 4 inch helix-packed column. The product boils 98–100° C./0.05 millimeters of mercury, $n_D^{25}$ 1.5118.

Analysis.—Calculated: C, 50.01; H, 5.72; Cl, 26.85. Found: C, 49.85; H, 5.48; Cl, 27.89.

EXAMPLE 8

3,5-Dichloro-2-[(2-dodecyloxy)ethoxy]pyridine

Follow the procedure of Example 5 using 23.0 grams (0.10 mole) of 2-(dodecyloxy)-ethanol in place of the monomethyl ether of ethylene glycol. The product after the evaporation of the solvent is a solid. Recrystallize the solid from 95% ethanol. The product is a solid melting 33–35° C.

*Analysis.*—Calculated: C, 60.63; H, 8.30; N, 3.72. Found: C, 60.64; H, 8.16; N, 3.77.

EXAMPLE 9

3,5-Dichloro-2-[2-(2-chloroallyloxy)ethoxy]pyridine

Follow the procedure of Example 5 using 13.7 grams (0.1 mole) of 2-(2-chloroallyloxy)ethanol in place of the monomethyl ether of ethylene glycol. Distill the product. The product is a liquid boiling 113–115° C./0.10 millimeters of mercury, $n_D^{25}$ 1.5483.

*Analysis.*—Calculated: C, 42.50; H, 3.57; N, 4.96. Found: C, 42.55; H, 3.73; N, 5.01.

EXAMPLE 10

3,5-Dichloro-2-[2-(3-dichloropropoxy)ethoxy]pyridine

Dissolve 24.8 grams (0.1 mole) of 3,5-dichloro-2-[2-(allyloxy)ethoxy]pyridine in 250 milliliters of carbon tetrachloride cooled to 5° C. Slowly bubble chlorine gas into this solution for 15 minutes. The temperature rises to 12° C. at this point. Continue chlorination for 4 hours at 5–10° C. Remove excess chlorine by passing nitrogen gas into the carbon tetrachloride solution. Then evaporate the carbon tetrachloride in vacuum. Distill the product through a simple distillation apparatus at 0.1 millimeter. The product boils at 140–143° C./0.1 millimeter of mercury, $n_D^{25}$ 1.5442.

*Analysis.*—Calculated: C, 37.64; H, 3.48; Cl, 44.46. Found: C, 37.43; H, 3.58; Cl, 44.13.

EXAMPLE 11

3,5-Dichloro-2-[2-(2,2,3-trichloropropoxy)ethoxy]pyridine

Dissolve 27.29 (0.095 mole) of the 3,5-dichloro-2-[2-(2-chloroallyloxy)ethoxy]pyridine of Example 9 in 250 ml. of carbon tetrachloride and cool to 5° C. Slowly pass chlorine gas into the solution. The temperature of the solution may rise to 10° C. Introduce chlorine gas for 5 hours while allowing the solution to warm to room temperature. Flush the solution of unreacted chlorine by passing nitrogen gas into the solution and evaporate the carbon tetrachloride under vacuum. Distill the resulting pale amber liquid under vacuum. The resulting product distills at a temperature of 153–156° C. at 0.20 mm. of mercury pressure, $n_D^{25}$ 1.5528.

*Analysis.*—Calculated: C, 33.03; H, 2.72; Cl, 51.27. Found: C, 33.98; H, 2.85; Cl, 50.16.

EXAMPLE 12

3,5-Dichloro-2-[(2-cyclohexyloxy)ethoxy]pyridine

To a stirred solution of 4.5 g. (0.04 mole) of potassium tertiary-butoxide in 50 ml. of tertiary butyl alcohol was added 5.8 g. (0.04 mole) of 2-(cyclohexyloxy)ethanol. After 15 min. was added 7.3 g. (0.04 mole) of 2,3,5-trichloropyridine in 25 ml. of tertiary butyl alcohol. After refluxing for 25 hrs., the solid was filtered off and washed with three 50 ml. portions of diethyl ether. The combined filtrate and washings were concentrated in vacuum and the liquid residue distilled to afford 4.0 g. (34% conversion) of colorless liquid, B.P. 172–176° (3.2 mm.), $n_D^{24}$ 1.5280.

By following the procedures of the examples, additional 3,5-dichloropyridoxyethyl hydrocarbon ethers may be prepared.

According to the method of using the compounds of this invention as pre-emergence herbicides, an amount of 3,5 - dichloropyridoxyethyl hydrocarbon ether which is phytotoxic to weed seeds is applied to soil implanted with crop seeds. The weed-phytotoxic amount employed varies from about 0.1 to about 10 pounds per acre. Preferably about 0.25 to about 4 pounds per acre is employed. Amounts larger than 10 pounds per acre are also effective to prevent the emergence of weed seeds; however, larger amounts are uneconomical and may tend to damage the crop seeds.

The composition aspect of this invention may be formulated for application as a dispersion in water or organic solvents or as a solution in organic solvents. The latter solutions can be formulated as dispersion in water with ionic cationic or nonionic surfactants. These surfactants also have the advantage that their presence aids penetration of the compound into plant seed and soil surfaces. Suitable water dispersions may be prepared with or without surfactants by ball milling or other fine grinding processes. The composition may also be formulated as a suspension using suspending agents such as lignin sulfonates, bentonite, dilute solutions of methocel and the like.

It is often desired to prepare an emulsion concentrate which is mixed with water in the field. These emulsion concentrates are prepared by dissolving the composition aspect of the invention with suitable organic solvents which are immiscible in water, such as xylene, naphtha solvents, isophorone, benzene, heptane, heavy mineral oils, kerosene and thereafter adding a surfactant. Surfactants suitable for dispersing the compounds are described in Kirk-Othmer, Encyclopedia of Chemical Technology, 2nd edition, Volume 19, pages 507–593.

The concentration of the pre-emergence weed control aspect of the invention in crop production involves applying the 3,5-dichloro-2-pyridoxyethyl hydrocarbon ether to the soil prior to the emergence of the food crop from the soil. The application may be made at the same time as the seeding operation and most commonly involves the use of a sprayer or granular applicator attached to the planter. The pre-emergence compound is applied to the soil surface immediately after covering the crop seed. As desired, the application may be a narrow band immediately in the vicinity of the planted food crop seed or the entire area may be treated. Additionally the chemical may be mixed with the top player of the soil at the time of application using suitable equipment.

The compounds of this invention possess the necessary properties to be effective in field use. They have a wide spectrum of weed control which is desirable because the food crops can be vested with many species of grasses and broad leaf weeds. Another important property is the lack of significant vital toxic activity towards food crops. This is an important consideration because it is impossible under field conditions to completely maintain a separation of the chemical from the crop seed and it is necessary that the compounds be able to prevent the germination of weed seeds without significantly affecting the crop seeds. Chemicals which perform this way must have unique and specific properties since some of the commercial crop plants are botanically related to the weed plants which infest fields in which crops are grown.

The activity of the pre-emergence herbicides embodied herein is observed in all types of soils and under various environmental conditions which can change the response of the crop to a given chemical. In the tables that follow, examples are set forth to illustrate the method of using the invention and are not intended to limit the scope of the method.

HERBICIDAL EVALUATIONS

Representative compounds embodied in this invention were evaluated for pre-emergence weed control efficacy relative to the production of crops. In addition, their performance was compared to that of the structurally analogous 3,5-dichloro-2-pyridoxyacetic acid.

The following Table I summarizes experiments performed showing the pre-emergence herbicidal activity of the composition aspect of this invention. The compound employed is formulated in solvents and thereafter the solution is dispersed in water and sprayed on the soil surface of a prepared flat containing crop seeds and weed seeds.

The formulation may be, for example, a 10% solution of the compound in xylene, or diacetone alcohol which solvent may also contain a surfactant such as Triton X-161. Other formulations may include a 1% solution of the compound in a 1:1 solution of acetone and diacetone alcohol. The choice of solvent is dictated by the individual solubility characteristics of the compound.

The method followed is to use ½ square foot flat seeded on the surface with the indicated weeds and planted with the indicated crops. A formulation of the chemical dispersed in water is sprayed on the soil surface and the flat held on the greenhouse bench for one month. Readings on emergence of weeds and crops are then made and compared with untreated flats.

In the tables which follow, the radicals listed under the heading "R" are understood to be the same as the group R in the following structural formula:

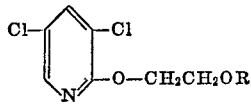

TABLE III

| R | Dosage in lbs./acre | Percent crop | | Percent weed control | |
|---|---|---|---|---|---|
| | | Wheat | Barley | Foxtail[1] | Pigweed |
| n-Propyl | 0.5 | 0 | 0 | 98 | 98 |
| Dodecyl | 0.5 | 0 | 0 | 95 | 90 |
| Control* | 0.5 | 25 | 30 | 100 | 100 |

[1] Setaria spp.
*3,5-dichloro-2-pyridoxyacetic acid.

Method.—Same as for Table II except weed seed is incorporated into the soil instead of seeding on surface.

Table I shows the general pre-emergence activity of the compounds of this invention. Particularly noteworthy is the high activity shown by these compounds. Individual compounds exhibit high activity even at the rate of 0.5

TABLE I.—PRE-EMERGENCE PERCENT KILL

| R | Dosage in lbs./acre | Barnyard grass[1] | Crab grass[2] | Lambs-quarter[3] | Amaranthus[4] | Wild oats[5] | Downy brome[6] |
|---|---|---|---|---|---|---|---|
| Phenyl | 1 | | 0 | 50 | 50 | 0 | 0 |
| Allyl | 0.5 | | 100 | *90 | *90 | 0 | 0 |
| Do | 10 | | 100 | 100 | 100 | 80 | 100 |
| Do | 2 | | 100 | 100 | 100 | 0 | 90 |
| Do | 1 | | 100 | 100 | 95 | 30-0 | 60-0 |
| Ethyl | 10 | | 100 | 100 | 100 | 40 | 100 |
| Do | 2 | | 100 | 100 | 100 | 0 | 90 |
| Do | 1 | | 80 | 100 | 100 | 0 | 50 |
| Do | 0.5 | | 100 | 70 | 80 | 0 | 0 |
| Benzyl | 1 | | 90 | *60 | 100 | 0 | |
| Do | 10 | 90 | 100 | | 100 | 0 | |
| Do | 5 | 50 | 100 | | 100 | 0 | |
| Do | 2 | 40 | 100 | | 90 | 0 | |
| Do | 0.5 | 0 | 100 | | 80 | 0 | |
| Methyl | 10 | | 100 | 100 | 100 | 20-40 | |
| Do | 2 | | 80 | 86 | 90 | 0 | |
| Propyl | 10 | | 100 | 100 | 100 | 20 | |
| Do | 10 | | 100 | 100 | 100 | 60 | |
| Do | 2 | | 90 | 90 | 80 | 0 | |
| Do | 2 | | 80 | 80 | 40 | 0 | |
| Do | 2 | | 100 | 100 | 60 | 0 | |
| Do | 1 | | 100 | 100 | *40 | 0 | |
| Butyl | 10 | | 100 | 100 | 100 | 10 | |
| Do | 10 | | 100 | 100 | 100 | 0 | |
| Do | 2 | | 2 | 40 | 60 | 0 | |
| Dodecyl | 10 | | 100 | 100 | 100 | 0 | |
| Do | 10 | | 100 | 100 | 100 | 0 | |
| Do | 2 | | 100 | 100 | 100 | 0 | |
| 2,3-dichloropropyl | 2 | | 100 | 70 | 100 | 0 | |
| Do | 10 | | 100 | 100 | 100 | 20 | |
| 2,2,3-trichloropropyl | 2 | | 100 | | 100 | 0 | |
| Do | 5 | | 100 | 100 | 100 | 20 | |
| Do | 10 | | 100 | 100 | 100 | 0 | |

[1] Echinochloa crusgalli. [2] Digitaria sanguinalis. [3] Chenopodium allrim. [4] Amaranthus retroflexus. [5] Avena fatua. [6] Bromus tectorum.
*Stunted.

TABLE II

| R | Dosage in lbs./acre | Percent crop injury | | Percent weed control | |
|---|---|---|---|---|---|
| | | Corn | Sugar beet | Crab grass[1] | Pig weed[2] |
| n-Propyl | 0.5 | 0 | 0 | 100 | 50 |
| n-Butyl | 2 | | | 60 | 60 |
| 2,3-dichloropropyl | 0.5 | 0 | 0 | 100 | 100 |
| Control* | 0.25 | 20 | 80 | 100 | 100 |

[1] Digitaria sanguinalis.
[2] Amaranthus retroflexus.
*3,5-dichloro-2-pyridoxyacetic acid.

or 1 pound per acre, and all are active at dosages of 10 pounds per acre.

Table V shows high pre-emergence activity where R is cyclohexyl at dosages of 1 and 2.5 lbs./acre. General contact herbicidal activity is shown on bean plants at 5 to 10 lbs./acre.

This activity is in sharp contrast to the compounds listed in Table IV below, which shows that same analogous compounds are much less active than the claimed compounds.

TABLE IV
Inactive compounds of structure

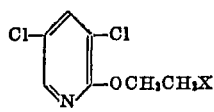

| X | Dosage in lbs./acre | Crab grass | Lambs-quarter | Amaranthus | Wild oats | Downy brome |
|---|---|---|---|---|---|---|
| $(C_2H_5)_2N$ | 1 | 0 | 0 | 0 | 0 | 0 |
|  | 10 | 50 | 80 | 100 | 20 | 0 |
| $C_2H_5S$ | 10 | 100 | 50 | 100 | 30 | 0 |
|  | 5 | *0 | *0 | *0 | 0 | 0 |
| $C_2H_5SO_2$ | 5 | 0 | 0 | 0 | 0 | 0 |
|  | 10 | 50 | 50 | 80 | 50 | 0 |
| 4-methoxyphenoxy | 10 | 70 | --- | *0 | 0 | 0 |
|  | 5 | 0 | --- | 0 | 0 | 0 |
| 4-tolyloxy | 10 | 0 | 0 | 0 | 0 | 0 |
| 2,4-dichlorophenoxy | 10 | 0 | *0 | *0 | 0 | 0 |
| 4-nitrophenoxy | 10 | 0 | 0 | 0 | 0 | 0 |
| 4-chlorophenoxy | 10 | 80 | --- | 10 | 0 | 0 |
|  | 5 | *60 | --- | 50 | 0 | 0 |

*Stunted.

TABLE V
Herbicidal activity of 3,5-dichloro-2-(cyclohexyloxyethoxy) pyridine preemergence

| Lbs./acre | Mustard | Red root | Foxtail | Crab-grass | Wild oat | Rye-grass |
|---|---|---|---|---|---|---|
| 5.0 | 100 K | 100 K | --- | 100 K | 100 | 100 |
| 2.5 | 500 K | 100 K | 100 K | 100 K | 0 | --- |
| 1.0 | 50 I | 90 I | 100 K | 90 I | --- | --- |

Note.—K=Percent kill; I=Percent growth inhibition.

Contact—Bean plants:

| Lbs./acre | Percent kill—Growth Inhibition |
|---|---|
| 0.1 | 0 |
| 1.0 | 0 |
| 5.0 | 100 |
| 10.0 | 100 |

Tables II and III, set forth the data showing the selectivity of compounds embodied in this invention. The control compound, shown for comparison, is an active pre-emergence compound but fails to exhibit selectivity in controlling weed seeds while permitting crop seeds to germinate. The claimed compounds, on the other hand, exhibit good weed control and also permit the crop seeds to germinate. This feature adds to the overall usefulness of the claimed compounds because the pre-emergence activity of the composition embodied herein may be utilized both bfore and after sowing crop seeds.

The pre-emergence activity of these compounds is shown using the compound alone. However, these compounds may be formulated with other herbicides in order to obtain additional activity against weed seeds which may be partially resistant to the compounds of this invention. This partial resistance may result either because an insufficient amount of the compound is applied or because the weed seed is only partially affected regardless of the amount applied.

In addition, it may be desirable to formulate the compound of this invention with herbicides having other activity, e.g., post emergence activity. These variations in utilizing the invention are known to those skilled in the art.

The claims:

1. A 3,5-dichloro-2-pyridoxyethyl hydrocarbon ether having the following formula $$Cl-\underset{N}{\underset{|}{\bigcirc}}-Cl$$
$$\quad\quad O-CH_2CH_2-OR$$

wherein R is a member of the group consisting of alkyl or haloalkyl having up to 18 carbon atoms, alkenyl or alkynyl having 3 or 4 carbon atoms, chloroalkenyl or chloroalkynyl having 3 or 4 carbon atoms, cyclohexyl, phenyl or benzyl with a proviso that each haloalkyl, haloalkeny or haloalkynyl group contains up to 6 chlorine atoms.

2. The compound of claim 1 wherein the 3,5-dichloro-pyridoxyethyl hydrocarbon ether is 3,5-dichloro-2-[2-(propoxy)ethoxy]pyridine.

3. The compound of claim 1 wherein the 3,5-dichloro-pyridoxyethyl hydrocarbon ether is 3,5 - dichloro - 2 - [2-(dodecyloxy)ethoxy]pyridine.

4. The compound of claim 1 wherein the 3,5-dichloro-pyridoxyethyl hydrocarbon ether is 3,5-dichloro-2-[2-(2,3-dichloropropoxy)ethoxy]pyridine.

5. The compound of claim 1 wherein the 3,5-dichloro-pyridoxyethyl hydrocarbon ether is 3,5 - dichloro - 2 - [2-(2,2,3-trichloropropoxy)ethoxy]pyridine.

6. The compound of claim 1 wherein the 3,5-dichloro-pyridoxyethyl hydrocarbon ether is 3,5 - dichloro - 2 - [2-(cyclohexyloxy)ethoxy]pyridine.

7. The compound of claim 1 wherein the 3,5-dichloro-pyridoxyethyl hydrocarbon ether is 3,5 - dichloro-2 - [(2-benzyloxy)ethoxy]pyridine.

References Cited
UNITED STATES PATENTS 3,576,616   4/1971   Nowotny _____ 260—297 X

OTHER REFERENCES

Karrer: Organic Chemistry, 4th English Edition, Elsevier Pub. Co. (NY) p. 928 (1950).

ALAN L. ROTMAN, Primary Examiner

U.S. Cl. X.R.

71—94

UNITED STATES PATENT OFFICE
CERTIFICATE OF CORRECTION

Patent No. 3,814,774     Dated June 4, 1974

Inventor(s) Reginald L. Whitaker and Herbert O. Smith

It is certified that error appears in the above-identified patent and that said Letters Patent are hereby corrected as shown below:

Column 9, Table 5, line 32 should read:

2.5_____100K     100K     100K     100K     0 _____ and not as stated.

Column 10, Claim 1, line 35-36, "haloalkeny" should read --haloalkenyl--

Signed and sealed this 24th day of September 1974.

(SEAL)
Attest:

McCOY M. GIBSON JR.
Attesting Officer

C. MARSHALL DANN
Commissioner of Patents